United States Patent
Friedrich (10) Patent No.: US 7,312,692 B2
(45) Date of Patent: Dec. 25, 2007

(54) METHOD FOR SELECTING ONE OR SEVERAL TRANSPONDERS

(75) Inventor: Ulrich Friedrich, Ellhofen (DE)

(73) Assignee: ATMEL Germany GmbH, Heilbronn (DE)

( * ) Notice: Subject to any disclaimer, the term of this patent is extended or adjusted under 35 U.S.C. 154(b) by 386 days.

(21) Appl. No.: 10/969,433

(22) Filed: Oct. 19, 2004

(65) Prior Publication Data
US 2005/0083178 A1 Apr. 21, 2005

(30) Foreign Application Priority Data
Oct. 21, 2003 (DE) ............... 103 49 647

(51) Int. Cl.
*H04Q 5/22* (2006.01)
(52) U.S. Cl. .................. 340/10.1; 340/10.31
(58) Field of Classification Search ............ 340/10.2, 340/10.1, 10.3, 572.1; 370/442, 348
See application file for complete search history.

(56) References Cited

U.S. PATENT DOCUMENTS

| | | | |
|---|---|---|---|
| 5,307,349 A * | 4/1994 | Shloss et al. | 370/442 |
| 5,489,908 A | 2/1996 | Orthmann et al. | |
| 5,541,928 A | 7/1996 | Kobayashi et al. | |
| 5,594,429 A | 1/1997 | Nakahara | |
| 5,751,570 A | 5/1998 | Stobbe et al. | |
| 5,811,885 A | 9/1998 | Griessbach | |
| 5,841,770 A | 11/1998 | Snodgrass et al. | |
| 5,856,788 A | 1/1999 | Walter et al. | |
| 5,929,780 A | 7/1999 | Pagnol et al. | |
| 6,198,382 B1 | 3/2001 | Berger et al. | |
| 6,265,962 B1 | 7/2001 | Black et al. | |
| 6,307,848 B1 | 10/2001 | Wood, Jr. | |
| 6,321,982 B1 | 11/2001 | Gaultier | |
| 6,377,203 B1 | 4/2002 | Doany | |
| 6,456,191 B1 | 9/2002 | Federmann | |

(Continued)

FOREIGN PATENT DOCUMENTS

DE  101 61 302  7/2003

(Continued)

OTHER PUBLICATIONS

Klaus Finkenzeller, "RFID-Handbuch", (RFID Handbook), 3$^{rd}$ Edition, Hauser publishers, 2002, pp. 203 to 224.

(Continued)

*Primary Examiner*—Edwin C. Holloway, III
(74) *Attorney, Agent, or Firm*—W. F. Fasse; W. G. Fasse (57) ABSTRACT

In a method for selecting, by a base station, one or more transponders out of a plurality of transponders, selection steps are performed at least at two selection levels or stages. The base station controls all selection steps at the first and second level. The first selection level includes: each transponder generates a random transponder number, the base station generates numbered time slots, each transponder transmits a marker if and when its random transponder number coincides with a time slot number. When a single transponder random number coincides with a time slot number the respective transponder is selected by the base station. If more than one transponder random numbers coincide with a time slot number the second selection procedure is performed at a second selection level as a stochastic or a deterministic or a mixed stochastic-deterministic selection procedure.

15 Claims, 3 Drawing Sheets

U.S. PATENT DOCUMENTS

| | | |
|---|---|---|
| 6,535,109 B1 | 3/2003 | Mahdavi |
| 6,538,563 B1 | 3/2003 | Heng |
| 6,774,766 B1 | 8/2004 | Moyer |
| 6,963,270 B1 | 11/2005 | Gallagher et al. |
| 6,988,667 B2 | 1/2006 | Stewart et al. |
| 7,009,526 B2 | 3/2006 | Hughes et al. |
| 7,023,356 B2 | 4/2006 | Burkhardt et al. |
| 7,053,754 B2 | 5/2006 | Mani |
| 7,057,511 B2 | 6/2006 | Shanks et al. |
| 2001/0014090 A1 | 8/2001 | Wood, Jr. |
| 2002/0188750 A1 | 12/2002 | Li |
| 2003/0061063 A1 | 3/2003 | Vacherand et al. |
| 2005/0024186 A1 | 2/2005 | Friedrich |
| 2005/0128130 A1 | 6/2005 | Friedrich |

FOREIGN PATENT DOCUMENTS

| | | |
|---|---|---|
| EP | 0 687 119 | 12/1995 |
| FR | 2805637 | 8/2001 |
| GB | 2340692 | 2/2000 |

OTHER PUBLICATIONS

Automatic Identification—Radio Frequency Identification for Item Management, Part 6: Mode 6—Physical Layer, Anti Collision System and Protocols for Ultra High Frequency (UHF) Systems; Working Draft ISO/IEC WD 18000-6 Mode 3; Feb. 1, 2002; pp. 1 to 125.

English Translation of Klaus Finkenzeller, "RFID-Handbuch", (RFID Handbook), 3$^{rd}$ Edition, Hauser publishers, 2002, pp. 203 to 224.

* cited by examiner

METHOD FOR SELECTING ONE OR SEVERAL TRANSPONDERS

CROSS-REFERENCE TO RELATED APPLICATION

The present application is related to my copending Application U.S. Ser. No. 10/903,721, filed on Jul. 30, 2004, entitled Method for Selecting One or More Transponders, the entire disclosure of which is incorporated herein by reference.

PRIORITY CLAIM

This application is based on and claims the priority under 35 U.S.C. §119 of German Patent Application 103 49 647.5, filed on Oct. 21, 2003, the entire disclosure of which is incorporated herein by reference.

FIELD OF THE INVENTION

One or more transponders are selected by a base station out of a plurality of transponders, for example in an identification system and in connection with remote sensors equipped with transponders.

BACKGROUND INFORMATION

Transponder selecting methods also referred to as anti-collision methods, are used for example in contactless identification systems. Such systems are known as radio frequency identification systems (RFID). Such systems conventionally comprise a base station or a so-called reading device and a plurality of transponders or remote sensors equipped with transponders. All of these transponders are simultaneously present in the communication range of the base station. In order to make sure that a data transmission takes place only between the base station and one transponder or between the base station and a group of transponders, it is necessary to first perform a selection method prior to any data transmission.

As a rule, conventionally a distinction is made between stochastic and deterministic selection methods. A detailed description of deterministic and stochastic selection methods can be found, for example in the RFID-Manual, Third Edition, author Klaus Finkenzeller, publisher Hanser, 2002, see particularly Chapter 7.2, entitled "Multiple Access Methods".

Stochastic methods do not require, in contrast to deterministic methods, an unambiguous so-called unique identification U-ID. The structure of such unique identification is, for example described in the Standard Sheet ISO 15963. An allocation of such U-IDs is performed, among others, by different organizations that are independent of the manufacturer of such base station transponder systems. Such organizations are, for example the EAN/UCC or the IATA. The allocation may, however, also be made by the manufacturer of the system. As a result, it is not always possible to assure the unambiguity of the U-ID in open systems in which transponders of different manufacturers may be within the communication range of a base station. Stochastic identification methods, however, make a selection possible even in systems without an unambiguous identification allocation. Examples of such stochastic methods are, for example the so-called ALOHA-method, the slot based or slotted ALOHA-method, and the dynamic slot based ALOHA-method.

The ALOHA-method is a transponder controlled, stochastic method in which the transponders transmit the data to be transmitted in a time sequence manner. The time sequence or time staggering is adjusted, as a rule, on the basis of a random number generated in the transponder. A so-called collision occurs, when several transponders transmit a marker within the same time slot. Thus, generally such a collision prevents that the base station can receive the transmitted data without any errors.

When comparing a simple ALOHA-method with a time slot based ALOHA-method the collision probability is substantially reduced in the time slot based ALOHA-method. The slot based ALOHA method is a stochastic method controlled by the base station. In such a method the transponders are active only at defined, synchronous points of time, whereby "active" means that data transmission begins. For this purpose the base station generates numbered time slots and each transponder generates a random transponder number, whereby each transponder whose random number corresponds to the number of a time slot, transmits data or a marker during this time slot to the base station. As a rule, the base station transmits a command to the transponders to initiate the selection procedure. The command also indicates the begin of a selection procedure. Upon receipt of the command, the respective random numbers are stored in a memory in the corresponding transponder. These random numbers are, for example generated in the respective transponder prior to any receipt of a command. If only one transponder transmits a marker within one time slot, that transponder is selected within the time slot or this transponder can be selected by the base station by transmitting from the base station an acknowledgment signal. At that point the base station can, for example, perform recording and/or reading operations with regard to the selected transponder. If several transponders transmit a marker within the same time slot, a so-called collision occurs. Depending on the bit coding, a base station can recognize such collisions either directly or with a certain delay, whereupon the respective time slot is ignored and attempts are made to find time slots in which no collision occurs or a new selection procedure is started by sending a new respective command to the transponders. Since the transponders produce or store new random numbers, the probability exists that in the separate procedure no collision will occur.

The collision probability depends on the number of the transponders present in the communication range of the base station and on the number of the provided time slots. A static determination of the number of time slots can lead to problems because the number of transponders present within a communication range of the base station may vary substantially. If the number of time slots is too small, the collision probability is substantial. On the other hand, if the number of time slots is too large, the result is too many time slots in which no transponder transmits data. In both instances, the time required for performing the selection procedure increases substantially. In order to achieve an optimal throughput, so to speak, the number of time slots during which the transponder transmit data, should correspond approximately to the number of transponders within the communication range of the base station.

The dynamic time slot based ALOHA-method aims at solving the above problem by enabling the base station to control the number of available time slots. For example, the base station can initiate a selection procedure with a small number of time slots. If collisions occur frequently because of the limited number of time slots, the base station can initiate a new selection procedure in which the number of time slots is increased, whereby the collision probability decreases. However, the time required for the performance of such a dynamic method or procedure is relatively large because the adjustment or selection of the optimal number of times slots can take up a substantial length of time. Another drawback of the dynamic slot based ALOHA-method is seen in the high effort and expense for the circuit arrangement required due to the method's complexity. Different methods for generating a random number are known for use in the stochastic procedure. For example the time period between a reset of the transponder and the point of time at which a first marker is received, can serve as the basis for calculating the random number. Other methods link numbers from two different memory areas of the transponder with each other in order to ascertain the random number. In that case, the selection procedure may be refined by additionally using a received data in the calculation of the random number. Other methods use a linear feedback controlled shift register for producing the random number. Such a shift register may, for example be operated by an inaccurate clock signal.

Deterministic selection procedures generally rely on a binary search method or on a so-called binary search algorithm. These deterministic search procedures assume that an unambiguous identification bit sequence is allocated to each transponder in the communication range of the base station. The identification bit sequence is customarily produced by the unique identification U-ID. Such a unique identification is allocated to the transponders, for example when the transponders are manufactured. The unambiguity of the U-ID can, however, not always be guaranteed due to the multitude of U-ID specifications in open systems that are not limited to a certain transponder type.

U.S. Pat. No. 5,856,788 describes a selection procedure in which the transponders are selected on the basis of a bit-by-bit comparing of the transponder's unambiguous, statically allocated identification bit sequence with a selection bit sequence. In the method according to U.S. Pat. No. 5,856,788 the selection is made by a semi-duplex procedure in which each transponder transmits a bit of its identification bit sequence and the base station subsequently transmits a selection bit based on the transmitted bit values. The transponders compare the respective bit of their identification bit sequence with the corresponding selection bit on the basis of a comparing criterion. The comparing criterion is the so-called "equal operator". More specifically, those transponders remain activated, which have in their identification bit sequence a respective bit that corresponds with the selection bit. Due to the semi-duplex method relatively much time is necessary until a transponder is selected.

In a publication "ISO WD 18000-6 Mode 3", published Feb. 1, 2002, a selection method is described in which the selection takes place also based on an unambiguous identification bit sequence. This known selection method operates as a full-duplex method, whereby the selection duration is reduced. The transponders are selected in that method in accordance with their unambiguous statically preassigned identification bit sequence.

OBJECTS OF THE INVENTION

In view of the foregoing it is the aim of the invention to achieve the following objects singly or in combination:

to realize a transponder selection procedure that does not necessarily require an unambiguous, statically preassigned U-ID in each of a multitude of transponders;

to enable a base station to select a transponder out of a multitude of transponders in an optimally short time duration;

to assure such an optically short selection time duration even when the number of transponders in a communication range of a base station varies substantially;

to provide a relatively small number of time slots in a first selection level or stage of the selection procedure while adapting, in a second selection stage or level, the number of time slots in accordance with a number of collisions encountered in the first selection stage or level;

to perform a time saving bit-by-bit comparing in the selection procedure, particularly at one selection level or at both selection levels or stages; and to provide a transponder selection method that is particularly suitable for use in transponder based identification systems and in connection with remote sensor systems with transponder equipped sensors.

The invention further aims to avoid or overcome the disadvantages of the prior art, and to achieve additional advantages, as apparent from the present specification. The attainment of these objects is, however, not a required limitation of the claimed invention.

SUMMARY OF THE INVENTION

The above objects have been achieved according to the invention by the combination of the following steps:

a) controlling by said base station (BS) a first selection procedure, b) producing a random transponder number by each transponder (TR1, TR2, . . . ), c) generating in said base station (BS) numbered time slots so that each time slot has a time slot number, d) transmitting by each transponder a marker to said base station during a time slot having a respective time slot number coinciding with said respective random transponder number, e) selecting that transponder which was the only transponder transmitting during said coinciding time slot, f) checking under the control of said base station at a second selection level whether more transponders than one have transmitted a marker in the same time slot to provide a respective collision signal, and g) performing, at said second selection level under the control of said base station and in response to said collision signal, a second selection procedure as any one of a stochastic, a deterministic, and a mixed stochastic-deterministic selection procedure.

According to the invention the base station controls the first and the second selection procedure when several transponders have transmitted their respective marker during the same time slot. During the second selections stage or level within the respective time slot a stochastic and/or a deterministic selection procedure is performed. This second selection procedure level or stages makes possible an address allocation, for example on the basis of a time slot based ALOHA-method within a first selection stage or level while the number of the time slots can be kept relatively small compared to a conventional slot based ALOHA-method. Thus, there is the possibility to keep the number of time slots in the first selection plane or stage constant or to dynamically adapt the number of time slots to the number of transponders currently present in the communication range of the base station. Due to the stochastic character of the first selection level or stage or the respective first selection procedure it is not absolutely necessary that an unambiguous, statically assigned identification bit sequence or an U-ID is provided in the transponders.

The second selection plane or stage according to the invention enables the selection of one or more transponders even if the number of transponders within the communication range of the base station varies substantially. When the number of transponders within the communication range of the base station is small compared to the number of time slots, which means that no collisions occur within a time slot or the base station does not recognize a collision, it is possible to perform in the first selection procedure level only a slot based ALOHA-method with a relatively small number of time slots. This feature of the invention in turn makes it possible to perform a time saving selection of the transponder or transponders. However, when collisions do occur within a time slot which means that the number of transponders within the communication range of the base station is large compared to the number of time slots, the second selection plane or stage permits a selection by using a further selection procedure which is independent of the first selection plane or stage and which can be stochastic, or deterministic, or a mixture of both selection procedures, namely a deterministic and stochastic selection procedure.

When a stochastic selection procedure is used in the second selection plane or stage, an ALOHA-method particularly a time slot based ALOHA-method may be used in or at the second selection level. Transponders which are active simultaneously in the respective time slot, more specifically those transponders having a random transponder number that coincides with the actual time slot number, produce or store for this purpose a further random number and participate in a further slot based ALOHA-method. The second slot based ALOHA-method is nested, so to speak, within the first selection procedure or is nested within the respective time slot.

When a deterministic selection procedure is performed in the second selection plane, a binary search procedure is involved. Such binary search procedure enables a rapid selection of one transponder or a group of transponders in or at the second selection plane or stage.

In a further embodiment of the invention involving a deterministic selection procedure at the second selection level, the following steps are involved:

h1) providing or generating in each of said plurality of transponders a respective transponder identification bit sequence, h2) transmitting by said base station in a bit-by-bit fashion a selection bit sequence to said plurality of transponders, h3) comparing, in accordance with a predeterminable comparison criterion, in each respective transponder said selection bit sequence with a respective identification bit sequence to provide a comparing result in the form of a selected bit, h4) allocating a weighting or logic value to said selected bit, and h5) selecting a respective transponder in accordance with said weighting or logic value of said selected bit.

The just outlined sequence of steps in a preferred embodiment of the invention results in a time saving selection because the selection takes place in a bit-by-bit fashion so that a complete bit sequence does not need to be transmitted prior to a point of time where a selection can start. Advantageously a random number bit sequence is produced in the respective transponder and that random bit number sequence is made available as an identification bit sequence that contains the random number bit sequence. Such a feature makes possible the selection of transponders within the second selection procedure plane or stage even if these transponders are not distinguished by their U-ID.

In order to check whether within the same time slot more than one transponder has transmitted a marker, the marker received by the base station is retransmitted at least partially by the base station to the transponders as a receipt or acknowledgment signal. The retransmitted marker receipt signal is checked in the transponders to see whether the marker retransmitted by the base station coincides with the marker transmitted by the respective transponder. When there is no coincidence, the respective transponder no longer participates within the respective time slot in the selection procedure. When the base station erroneously does not recognize any collision, this feature of the invention prevents that a transponder is erroneously selected.

By using an encoding of the "3-phase-1" type, for the transmission of the marker from a transponder to the base station, it becomes possible for the base station to recognize the bit position of a collision. Such "3-phase-1" encoding, is for example, described in the above mentioned ISO WD 18000-6 Mode 3.

The above mentioned random transponder number as used in the first selection plane and/or a random number as used in the second selection plane are generated by a clocked linear shift register that is feedback controlled. The supply of the clock signal to the shift register is deactivated during phases when the transponder has a power input or power consumption that is increased relative to an average transponder power input. Incidentally, the term "random number" or "random transponder number" is intended to encompass any random number bit sequence in the first and/or second selection plane or stage. The deactivation of the clock signal during phases of high power consumption of the transponder reduces a peak power consumption value of the transponder. As a result, the communication or interrogation range between a base station and a transponder is increased. Advantageously the deactivation of the clock signal is performed during a data transmission between the base station and the transponder, whereby the communication range is increased.

Preferably, the deactivation of the clock signal supply is achieved by a controllable logic gate which is connected between a clock signal generator and the shift register. Controlling the clock signal supply through a logic gate provides a simple realization of the activating and deactivating of the clock signal generator.

Preferably, the random number generation of the first selection stage or level and the random number of the second selection level or stage is produced by one and the same clocked linear shift register that is feedback controlled. Here again the term "random number" encompasses any random number bit sequence. By using the same linear shift register the required chip surface is reduced as well as the production costs compared to using a separate shift register for the generation of each random number or random number bit sequence in the first and second selection levels. Moreover, by using a single shift register the power consumption is reduced, whereby again the communication range between the base station and the transponder or transponders is increased.

It has also been found to be efficient to allocate a first portion of a number of bits of the shift register to the random number of the first selection plane or stage and to allocate the remaining portion of bits of the same shift register to the second random number or random number bit sequence. As a result, a simultaneous production of both random transponder numbers in the first and second selection level is possible.

According to a further embodiment of the invention the random number of the first selection level or stage is produced with a shift register and then stored. Then, the random number of the second selection stage is produced with the same shift register and stored separately from the random number of the first selection plane or stage. The read-out of the shift register content for obtaining the random numbers is triggered when entering the respective selection plane or stage. Thus, the entire shift register capacity is available for the generation of the random numbers.

It is also advantageous to operate the shift register with a clock signal of reduced frequency after the shift register has produced the random number of the first selection plane at a higher clock signal frequency. This feature again reduces the power consumption, thereby increasing the communication range.

In case the value range of the random number or of a random number bit sequence of the second selection plane is inadequate, the invention teaches producing a further random number by a logic linking of the random number or random number bit sequence of the second selection plane with transponder specific data. Such a further random number can then be used for or in the second selection plane.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
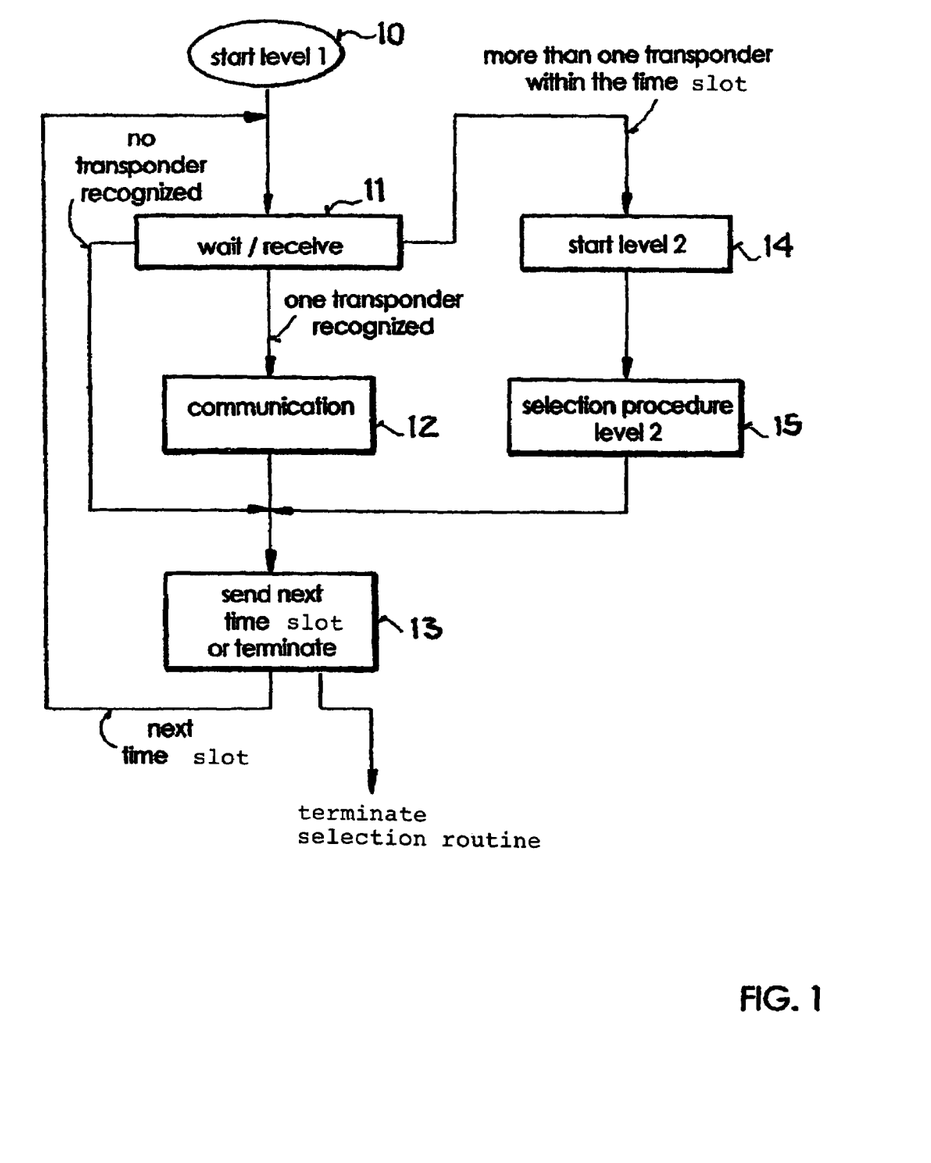
FIG. 1 is a flow diagram of a selection method with two selection levels or stages according to the invention.
Figure 2:
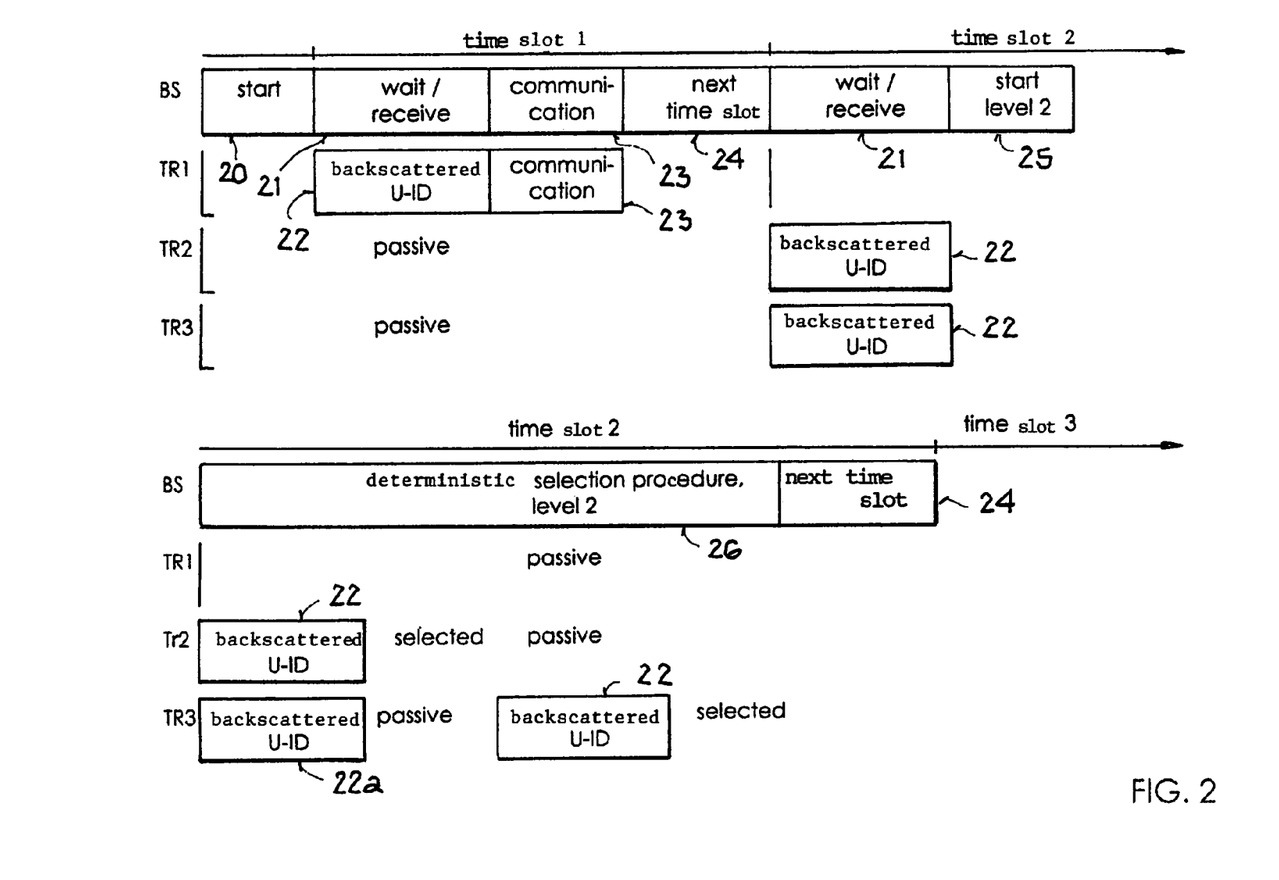
FIG. 2 is a diagram of a time sequence of the selection method according to FIG. 1 illustrating an example selection situation.

FIG. 1 shows a flow diagram of a selection method or procedure for selecting one or more transponders TR1, TR2, TR3 out of a multitude of transponders by a base station BS capable of initiating and controlling two selection levels or stages. The transponders operate on the basis of backscatter or reflection. FIG. 2 illustrates a diagram of a respective time sequence of the selection procedure of FIG. 1 showing an example of a selection situation in which three transponders TR1, TR2 and TR3 are present in the communication range of the base station BS. These three transponders are selected in sequence.

A step 10 in FIG. 1 starts the selection procedure in or at a first selection plane or stage. Typically, the base station BS transmits for this purpose a command 20 to the transponders TR1 to TR3 as shown in FIG. 2. This command starts a selection procedure or indicates the begin of a selection procedure. Upon receipt of the command 20 respective random numbers are generated in the transponders TR1 to TR2. Alternatively, these random numbers may be calculated and then stored in a memory. Simultaneously with starting to generate the random numbers, an internal time slot number counter of the base station is set to a starting value.

During a step 11 shown in FIG. 1, the base station BS waits for a retransmission from the transponders TR1 to TR3. The base station receives these retransmissions provided a marker is transmitted. FIG. 2 illustrates this state of the base station BS as a "wait or receive" time duration 21.

The transponders TR1 to TR3 compare the value of their internal time slot number counter with the stored random number and transmit a marker in response to a coincidence between the random number and the count in the time slot number counter. The marker represents the transponders U-ID. In the selection situation shown in FIG. 2 only the transponder TR1 exhibits a random number that coincides with the first time slot transmitted by the base station BS. Thus, the transponder TR1 transmits its U-ID or marker with an encoding of the "3-phase-1" type during a backscatter time duration 22 within the first time slot to the base station. The base station receives the U-ID or marker and recognizes with the aid of the encoding that no collision has occurred, more specifically that no further transponder has transmitted its U-ID or marker simultaneously with the transmission by the transponder TR1. Thus, the transponders TR2 and TR3 remain passive because their respective random transponder numbers do not coincide with the number of the instantaneous time slot. Thus, transponders TR2 and TR3 now wait for a base station command which starts the next time slot.

The transponder TR1 is now the preliminarily selected transponder whereby for the final selection further steps have to be performed, for example the transmission of a receipt or acknowledging signal from the base station to the respective transponder. During step 12 shown in FIG. 1 the base station BS and the transponder TR1 communicate with each other whereby the base station may, for example perform a recording and/or reading operation with regard to the selected transponder TR1. This bi-directional communication is illustrated in FIG. 2 by a communication time duration 23.

Due to phase rotations and substantial signal level differences, it is possible, particularly when large distances between the transponders TR1 to TR3 and the base station BS are involved, that a collision occurs which is not recognized by the base station in spite of a suitable encoding. In order to enhance the collision recognition, there is a possibility, not shown in FIG. 2, in addition to a suitable encoding, that the U-ID received by the base station BS is retransmitted to the transponders TR1 to TR3 as a receipt or acknowledgment signal. The respective transponders TR1 to TR3 then check whether the marker or U-ID retransmitted by the base station coincides with the respective marker that has been transmitted by the respective transponder TR1 to TR3. When a transponder recognizes that no coincidence exists, that transponder no longer participates in the current selection procedure during the current time slot. When a coincidence exists, the respective transponder is selected.

When the communication with the transponder TR1 is concluded as shown in step 12, the base station BS transmits a command signifying the next time slot. This transmission of the "next time slot" command to the transponders TR1 to TR3 takes place in step 13 of FIG. 1. After the transponders have received the command: "next time slot" (time duration 24 in FIG. 2), the transponders step-up their internal time slot number counter. In FIG. 2 this step-up corresponds to a time duration 24. Alternatively, the base station BS could transmit the number of the current or actual time slot to the transponders TR1 to TR3. The previously selected transponder TR1 no longer participates in the selection procedure. When the base station BS intends to end the selection procedure, the base station transmits during step 13 a selection ended command instead of the next time slot command. This end of selection command indicates to the transponders that the selection process has been terminated. The transponders then switch into a respective operational state.

If the selection procedure is continued, the base station BS returns to step 11 shown in the flow diagram of FIG. 1. More specifically, the base station BS waits for a return response from the transponders TR2 and TR3 and receives such a response in case a marker is being transmitted by the transponders TR2 and TR3. FIG. 2 shows this situation in a renewed wait/receive time duration 21.

The transponders TR2 and TR3 exhibit identical random transponder numbers in the selection situation illustrated in FIG. 2. Thus, these transponders transmit, following the next time slot command 24, in the respective backscatter time duration 22, simultaneously their respective U-ID, whereby a collision of bit positions occurs since their bit values do not coincide. Due to the encoding of the bits, the base station BS recognizes the collision and branches out to a step 14 instead to the step 12 as shown in FIG. 1.

The base station BS transmits during step 14 of FIG. 1 a command 25 shown in FIG. 2 to the transponders TR1 to TR3. This command 25 indicates the beginning of a selection procedure in the second selection plane or stage.

The second selection procedure is performed during step 15 nested within the second time slot, wherein the second selection procedure is a stochastic selection procedure or a deterministic selection procedure or a mixed deterministic and stochastic selection procedure.

A stochastic selection procedure can, for example be performed as a simple ALOHA-method, as a slot based ALOHA procedure, or as a dynamic slot based ALOHA-procedure. Following receipt of the start command 25 the transponders TR2 and TR3 again produce in this case respective transponder random numbers or calculate such numbers which are then stored. Simultaneously an internal sub-time slot number counter is set to its starting value. Next, a nested ALOHA-method is performed within a time slot of the primary, slot based ALOHA-method.

A conventional binary search procedure may be performed, for example as a deterministic procedure. A suitable example in this case is the above mentioned standard "ISO-WD 18000-6 Mode 3" of Feb. 1, 2002. This selection method performs the selection with the aid of an U-ID.

A mixed deterministic and stochastic selection procedure that would be possible for use in the second selection plane or stage according to the invention is described in my copending U.S. patent application U.S. Ser. No. 10/903,721, filed Jul. 30, 2004, which is not a prior publication. The disclosure of said U.S. Ser. No. 10/903,721 is incorporated herein by reference to the full extent of the disclosure thereof. The selection is performed according to the copending application on the basis of an identification bit sequence which comprises a static component or an U-ID component as a marker and a dynamic component. The dynamic component is based on a random transponder number generated in the respective transponder. The selection is performed by the following steps. Each transponder generates a respective identification bit sequence. The base station transmits in bit-by-bit fashion a selection bit sequence to the transponders. A bit-by-bit comparing between the respective bits of the identification bit sequence and the selection bit sequence is performed by each respective transponder on the basis of a predeterminable comparing criterion. A weighting or logic value is allocated to a selection bit based on the comparing result. The respective transponder is selected depending on the weighting or logic value of its selection bit.

The second selection procedure illustrated in present FIG. 2 is a deterministic selection procedure and is performed in accordance with the standard "ISO WD-18000-6 Mode 3". The base station BS transmits in accordance with this standard a bit-by-bit selection bit sequence in a time duration 26. The transponder TR2 scatters its identification bit sequence back to the base station BS in a full duplex operation during a back scatter time duration 22. This identification bit sequence corresponds or coincides with the selection bit sequence. Thus, the transponder TR2 is selected. The identification bit sequence of the transponder TR3 does not coincide with the selection bit sequence. Thus, the transponder TR3 transmits only a portion of its identification bit sequence back to the base station during a backscattering time duration 22*a*. The backscattering is terminated at a point of time at which a bit of the selection bit sequence does not coincide with a respective bit of its identification bit sequence. Thus, the transponder TR3 remains passive. Instead of selecting a single transponder, there exists the alternative possibility of selecting groups of transponders. That is, in this case the transponders TR2 and TR3 are selected simultaneously. Following the selection, a bi-directional data transmission is performed between the transponder TR2 and the base station. This bi-directional data transmission is not shown in the drawings.

The base station transmits within the deterministic selection procedure again a start command, not shown, for the following selection of the transponder TR3. This renewed start command initiates a second deterministic selection procedure at the second selection level. Since the transponder TR2 has already been selected in the preceding selection procedure, it no longer participates in the following selection procedure.

The base station BS transmits now in a bit-by-bit fashion a selection bit sequence and the transponder TR3 scatters its identification bit sequence back to the base station in a full duplex operation. This backscattered identification bit sequence coincides with or corresponds to the selection bit sequence. Following the selection of the transponder TR3 a bi-directional data transmission takes place between the transponder TR3 and the base station BS. This bi-directional data transmission is not illustrated.

Thereafter the base station BS transmits a next time slot command to the transponder TR1 to TR3 as shown in step 13 in FIG. 1, whereupon the transponders step up their internal time slot number counters. This step up corresponds in FIG. 2 to the time duration 24. The base station BS does not receive any markers during the next following time slots because in the shown selection situation there are no further transponders within the communication range of the base station BS. Following the work down of all time slots, the base station BS terminates the selection procedure by transmitting a respective command.

The present selection procedure enables the time saving selection of one or several transponders out of a plurality or multitude of transponders by a base station even if the number of transponders within the communication range of the base station varies considerably. An unambiguous, statically allocated U-ID in the transponders is not necessarily required for performing the present two level selection method.

Figure 3:
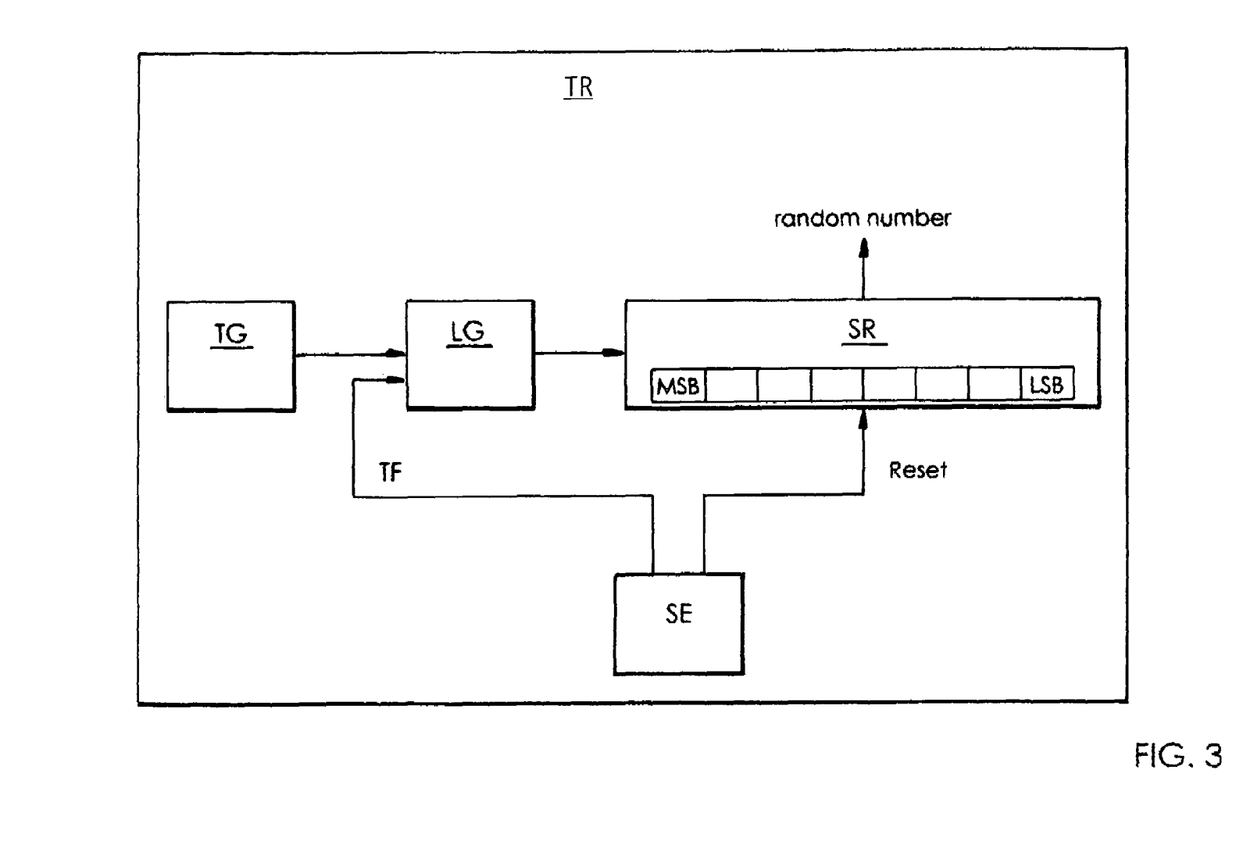
FIG. 3 is a block circuit diagram of a basic circuit arrangement for generating random numbers with the aid of a linear shift register that is feedback controlled.

FIG. 3 shows a block circuit diagram of a principle arrangement for generating random transponder numbers.

The arrangement is integrated into the respective transponder TR. The arrangement comprises a clock signal generator TG, a controllable logic gate LG, a control unit SE, and a clocked, linear shift register SR that is feedback controlled and generates the random transponder numbers. The shift register SR is reset in the course of an initialization by the control unit SE which provides a reset signal, whereby the shift register SR assumes a defined starting value.

The clock signal generator TG supplies a clock signal to the shift register SR. The logic gate LG is arranged between the clock signal generator TG and the shift register SR or rather a clock signal input of the shift register SR. The logic gate LG is controlled by a clock signal release signal TF supplied by the control unit SE. When the clock signal release signal TF has its release signal level, a clock signal is supplied to the shift register RS by the clock signal generator TG. More specifically, the clock signal supply to the shift register is active, whereby the shift register produces continuously occurring random transponder numbers based on the clock signal. When the clock signal release signal TF assumes a blocking level, the clock signal is decoupled from the shift register SR. More specifically, the clock signal supply is deactivated and random numbers are not produced. As a result, the power consumption of the arrangement is substantially reduced when the clock signal supply is deactivated.

The control unit SE controls the logic gate LG in such a way that the clock signal supply to the shift register SR is deactivated during phases with an increased power consumption by the transponder TR as compared to an average power consumption. Phases with an increased power consumption occur particularly during a data transmission between the base station BS and the transponder TR.

In case a stochastic or a mixed deterministic-stochastic selection procedure is performed in or at the second selection level or stage, it may become necessary to generate a second random number or random number bit sequence. The circuit arrangement shown in FIG. 3 makes it possible to generate a random transponder number for the first selection plane or stage as well as a random number or random number bit sequence for the second selection level or stage. Only a single shift register SR is required for generating the random numbers or random number bit sequences. As a result, the required chip surface is reduced and the production costs are correspondingly reduced compared to a realization in which each selection level or stage has its own shift register for the random number production. Moreover, the power consumption is reduced, whereby the communication range between the base station BS and the transponder TR is increased.

In a first variant or embodiment for generating two different random numbers with the help of but one shift register SR, the number of bits in the shift register is larger than would be necessary for generating only the random number of the first selection level or stage.

If a shift register SR having an eight bit capability is used, it is, for example, possible to allocate five bits of the shift register SR to the random number of the first selection level or stage and to further allocate three bits of the shift register SR to the random number of the second selection stage or level. Up to thirty-two time slots within the first selection stage can be distinguished with the aid of the five bits of the first selection level or stage. With the aid of the remaining three bits of the second selection level or stage it is possible to address up to eight different transponders, whereby attention needs to be paid that not all bits of the shift register SR can be zero at the same time.

In case the above discussed value range of the random number for the second selection level or stage is not sufficient, it is possible to generate a further random number by a logic linking of the random number of the second selection plane with transponder specific data. This additional random number is used as the random number of the second selection level or stage. The transponder specific data may, for example, be data from a memory of the transponder which is addressed with the aid of the random number of the second selection level or stage. The above mentioned logic linking may involve any random logic operations, for example an AND operation, an OR operation, or a XOR operation may be used.

In the present method the shift register SR may receive the clock signal until the selection procedure of the first selection level or stage is started by the base station by transmitting a respective start command. The binary content of the shift register is read-out following the receipt of the start command and a random number for the first selection level as well as a random number for the second selection level are produced separately, more specifically, the random numbers are produced separate but simultaneously. Then the shift register SR is deactivated, whereby the power consumption is reduced.

In an alternative embodiment of the invention the random number of the first selection level or stage is generated by the shift register SR in response to the receipt of the respective command. The random number is then read-out of the shift register and stored, whereby the full capacity of the shift register is available for generating the random number. Then, the clock signal supply to the shift register SR remains activated until a further random number is required in the second selection level. The second random number for the second selection level is then retrieved from the shift register and stored separately from the random number of the first selection level. Thus, it is possible to use the full capacity of the same shift register for generating also the random number of the second selection level. This operation, therefore, increases the available value ranges of the random numbers of the first and of the second selection level. However, this operation has a larger power consumption compared to the simultaneous production of the random numbers for both selection stages. In order to reduce the power consumption, the shift register may continue to operate with a reduced clock signal frequency when producing the second random number compared to the production of the first random number. Alternatively, the clock signal supply can be deactivated during communication with the base station.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for selecting by a base station at least one transponder out of a plurality of transponders, said method comprising the following steps a) to e) performed as a first selection procedure at a first selection level and steps f) and g) performed as a second selection procedure at a second selection level:

a) controlling by said base station (BS) a first selection procedure,
   b) producing by each transponder (TR1, TR2, . . . ) a random transponder number, c) generating in said base station (BS) numbered time slots so that each time slot has a time slot number, d) transmitting by each transponder a marker to said base station during a time slot having a respective time slot number coinciding with said respective random transponder number, e) selecting that transponder which was the only transponder transmitting during said coinciding time slot, and performing said second selection procedure at said second selection level by f) checking whether more transponders than one have transmitted a respective marker in the same time slot to provide a respective collision signal, and g) performing under the control of said base station and in response to said collision signal a second selection procedure as any one of a stochastic, a deterministic, and a mixed stochastic-deterministic selection procedure, said method further comprising generating any random transponder number, including said random transponder number of step b), by means of at least one clocked, linear shift register, providing a clock signal for operating said at least one clocked, linear shift register, and feed back controlling a supply of said clock signal to said clocked, linear shift register in response to a power consumption of said at least one transponder so that said clock signal supply is deactivated during phases of an increased power input to said at least one transponder compared to an average power input to said at least one transponder.

2. The method of claim 1, wherein said second selection procedure is performed as a stochastic ALOHA-selection procedure.

3. The method of claim 2, wherein said stochastic ALOHA-selection procedure is a time slot based selection procedure.

4. The method of claim 1, wherein said second selection procedure is performed as a deterministic binary search procedure.

5. The method of claim 1, further comprising performing said second selection procedure at said second selection level by the following substeps:

h1) generating in each of said plurality of transponders a respective transponder identification bit sequence, h2) transmitting by said base station in a bit-by-bit fashion a selection bit sequence to said plurality of transponders, h3) comparing, in accordance with a predeterminable comparison criterion, in each respective transponder said selection bit sequence with a respective identification bit sequence to provide a comparing result in the form of a selected bit, h4) allocating a logic value to said selected bit, and h5) selecting a respective transponder in accordance with said logic value of said selected bit.

6. The method of claim 5, further comprising generating said identification bit sequence in each transponder as a bit sequence that includes a random bit sequence.

7. The method of claim 1, further comprising checking whether more than one transponder is transmitting a respective marker within the same time slot, by retransmitting at least partly a received marker, from said base station to said transponders comparing in each transponder whether a retransmitted marker is matching the marker transmitted by the respective transponder, and excluding any transponder from any further selection procedure if there is no matching within said time slot.

8. The method of claim 1, further comprising encoding said at least one marker for said transmitting of step d) in accordance with a 3-phase-1 type encoding.

9. The method of claim 1, further comprising generating any random transponder number including said random transponder number of step b) as a random number bit sequence.

10. The method of claim 1, further comprising deactivating said clock signal during a data transmission from said base station to any one of said plurality of transponders (TR1, TR2, TR3).

11. The method of claim 1, wherein said clock signal supply to said shift register is deactivated by means of a logic gate connected between a clock signal generator and said shift register and wherein said logic gate is responsive to said feed back controlling.

12. The method of claim 1, further comprising allocating a first portion of a number of bits of said clocked, linear shift register to said random transponder number of step b) of said first selection level, and allocating a remainder portion of shift register bits to any second random transponder number of said second selection level.

13. The method of claim 1, further comprising first generating said random transponder number of said step b) of said first selection level by means of said at least one clocked, linear shift register and storing said random number in a memory, then generating any second random transponder number of said second selection level also in said at least one clocked, linear shift register and storing said second random transponder number separately from said random transponder number of said first selection level.

14. The method of claim 13, further comprising clocking said at least one clocked, linear shift register with a larger clock frequency for generating said first random transponder number and operating said shift register with a smaller clock frequency, relative to said first clock frequency for generating said second random number.

15. The method of claim 1, further comprising generating an additional random transponder number in response to a recognition that a second random transponder number of said second selection level is inadequate, wherein said second random transponder number is formed by a logic linking of transponder specific data with a random transponder number of said second selection level.

* * * * *